June 7, 1927.   1,631,831
D. PALMER-JONES
COUPLING OR CLAMPING DEVICE FOR SCAFFOLDING
AND OTHER FRAMEWORK STRUCTURES
Filed Sept. 16, 1926   2 Sheets-Sheet 1

Inventor
Daniel Palmer-Jones
By
his Attorneys.

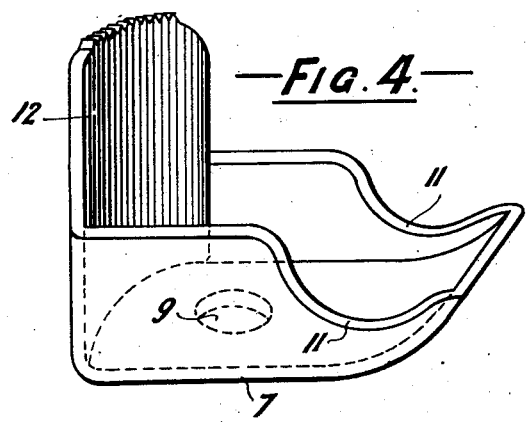
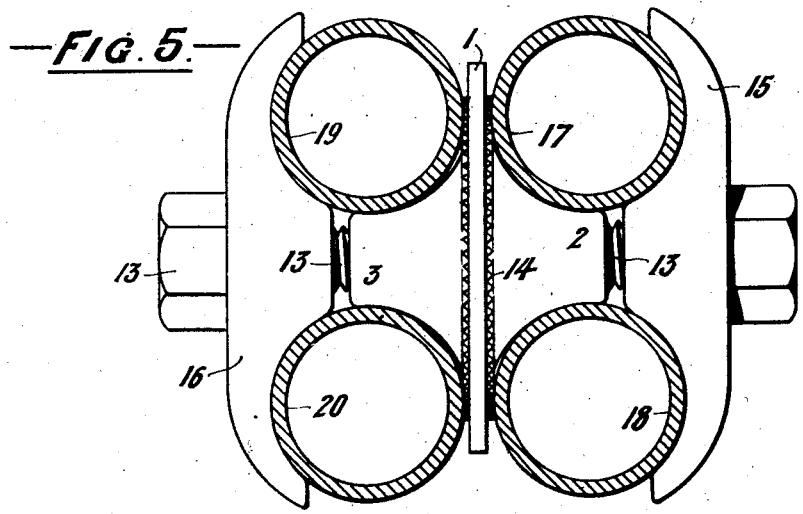
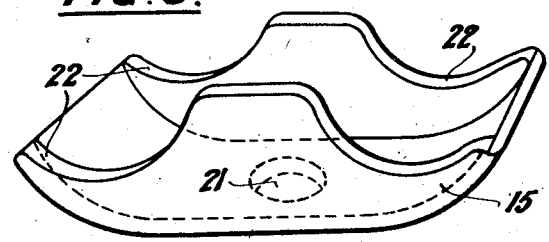

Patented June 7, 1927.

1,631,831

UNITED STATES PATENT OFFICE.

DANIEL PALMER-JONES, OF STOCKWELL, LONDON, ENGLAND, ASSIGNOR OF ONE-HALF TO SCAFFOLDING (GREAT BRITAIN) LIMITED, OF STOCKWELL, LONDON, ENGLAND.

COUPLING OR CLAMPING DEVICE FOR SCAFFOLDING AND OTHER FRAMEWORK STRUCTURES.

Application filed September 16, 1926, Serial No. 135,714, and in Great Britain October 20, 1925.

The present invention refers to improvements in devices for coupling or clamping together tubular and other members of scaffolding and other framework structures, such as the tubular metal framework of buildings, and the devices hereafter dealt with are particularly applicable for coupling or clamping together tubular or other members which are cylindrical in cross section.

In all of such coupling devices it is of course essential that by their employment the members clamped, hereafter termed in this specification scaffolding members, shall be firmly and securely held in the desired relation to each other, whether the members are parallel to each other or at any angle to each other, whilst at the same time it is essential that the coupling devices shall be of extremely simple construction and consist of few parts so that they can be manufactured cheaply and utilized effectively by practically unskilled labour.

Now the object of the present invention is to provide a device, which shall not only fulfill the foregoing requirements, but which also shall enable two scaffolding members to be coupled together with their axes in parallel planes at such a distance apart that one of such scaffolding members can be placed with its axis at any desired angle to the other scaffolding member in their respective planes, or by which, by merely changing one of the fittings of the device hereafter described, two scaffolding members can be clamped with their axes parallel to each other and in the same plane, while at the same time one or two scaffolding members can be clamped by the same device with their axes in a parallel plane but with their said axes at any desired angle to the axis or axes of the other scaffolding member or members first mentioned.

The invention further provides that the same clamping device can be first fixed to a scaffolding member or to two parallel scaffolding members, and then a further scaffolding member or two scaffolding members can be placed in the coupling device and clamped at any angle or parallel to the first mentioned scaffolding member or members, it being a point of advantage to be enabled to fix the coupling device to one or two scaffolding members the axes of which are parallel to each other, and then, the coupling device having been so fixed, to apply a further scaffolding member or scaffolding members to the coupling device and to clamp those scaffolding members in position, so that, for instance, the coupling device can be fixed to two parallel vertical scaffolding members and hold the latter together, and then a diagonal scaffolding member or two parallel diagonal scaffolding members can be applied and coupled at any angle to the first mentioned vertical scaffolding member or members for bracing purposes.

The invention will be described with reference to the accompanying drawings, whereon Fig. 1 is a side elevation of one construction of the invention.

Fig. 4 is a perspective view showing the under side of a gripping jaw (detached) constructed for gripping a single scaffolding member.

Fig. 5 is a side elevation showing a modification of the device shown in Fig. 1 and Fig. 6 is a perspective view showing the under side of a gripping jaw constructed for gripping two pairs of parallel scaffolding members.

Figure 1:
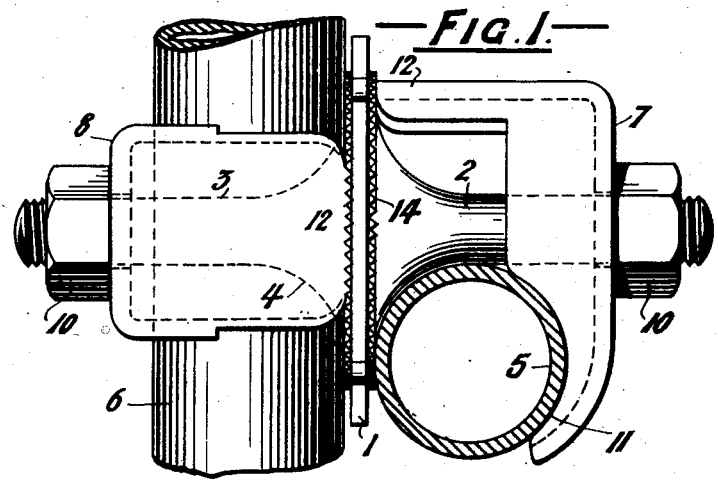

Referring to Fig. 1 of the drawings, the body of the coupling member there shown consists of a disc 1 having the two coaxial stems 2, 3 one proceeding from each face of the disc, and constructed integrally with the disc 1. The disc 1, Fig. 1, is circular, but instead of such a disc the plate 1 may be square, or polygonal, or other shape desired.

The base of each stem 2, 3 conjoining the face of the disc is of curved formation, as at 4, having a radius corresponding to the cross section of the cylindrical scaffolding members which are to be clamped, and in the construction shown at Fig. 1, the ends of the stems are screwthreaded.

At Fig. 1 two scaffolding members 5, 6 are shown clamped with their axes at right angles to each other, the scaffolding members illustrated being of metal, circular in cross section and tubular, although the invention is not limited to the construction of the scaffolding members, which might be solid and of other material than metal.

For each stem a gripping jaw is provided, such as the jaws 7, 8, an example of which is illustrated in perspective at Fig. 4, and the jaws are passed over the stems, the stems passing through a hole such as 9, illustrated in dotted lines at Fig. 4, so that when nuts such as 10 are screwed against the jaws 7, 8, the latter will be forced on to the scaffolding members 5, 6 and grip the same.

Such jaws 7, 8 for gripping single members are constructed with a gripping surface 11 (Fig. 1) which conforms to the cross section of the scaffolding members, such as 5, 6, which are to be gripped, and preferably each jaw for gripping a single member upon one side of the stem is constructed with an extension 12 upon the opposite side of the stem, which extension is constructed as shown to take a bearing on the face of the disc 1, but it is to be understood that in some cases the extension 12 may be dispensed with although it is considered advantageous to construct the device with such an extension.

In utilizing such a clamping device the body of the coupling member is applied to the scaffolding, such as 5, so that the cylindrical scaffolding member contacts with the disc 1 in line contact and also contacts, likewise in line contact, with the curved base of the stem 2. The jaw 7 is then threaded over the end of the stem 2 so that the gripping surface 11 of the jaw 7 bears on the scaffolding member 5 and fits partly around it, while the extension 12 of the jaw 7 bears on the disc 1 on the side of the stem opposite to that on which the scaffolding member 5 bears. A nut 10 is then screwed onto the screwthreaded projecting end of the stem 2 so as to bear against the outer face of the gripping jaw 7 with the requisite pressure, and it will then be found that the scaffolding member 5 is firmly secured to the coupling device, and the latter is itself supported upon the scaffolding member 5.

A second scaffolding member 6, which is to be coupled either at right angles to the scaffolding member 5 or at any other angle in a plane parallel with the plane containing the axis of the scaffolding member 5, is then applied to the body of the coupling member so that the scaffolding member 6 contacts with the disc 1 and also is in line contact with the curved base of the stem 3; the jaw 8 is then threaded over the stem 3 so that the gripping surface 11 of the jaw bears and partly embraces the scaffolding member 6, and the extension 12 bears on the disc 1. A nut 10 is then screwed onto the screwthreaded end of the stem 3 and the necessary pressure applied thereby to the gripping jaw 8, so that the scaffolding member 6 is firmly held.

Obviously in such a construction one of the scaffolding members may be located either parallel to, or at any angle to the other scaffolding member, the axes of the scaffolding members being always in planes parallel to each other.

For instance, if a scaffolding member 6 is vertical, a scaffolding member 5 can be clamped thereto with its axis diagonal so as to form, for instance, a bracing member between two vertical scaffolding members.

Figure 2:
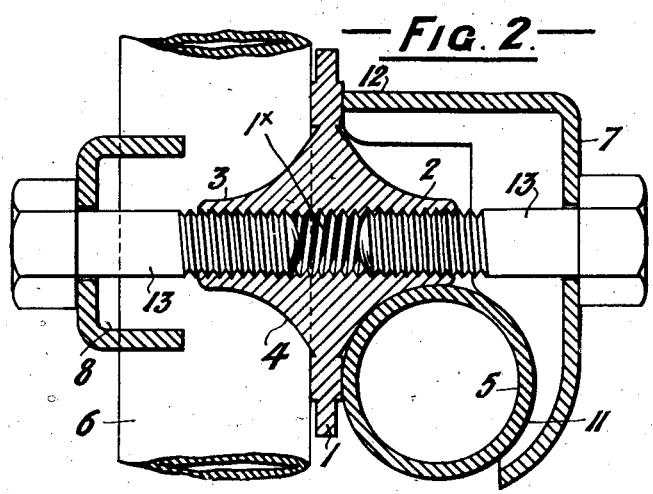
Fig. 2 is a sectional side elevation of a modified construction.

In a modified construction, as shown at Fig. 2, there is a screwthreaded axial boring $1^x$ through the stems 2, 3, and bolts 13 pass through the gripping jaws 7, 8 and engage in the screwthreaded axial boring, so that the jaws can be forced on to the scaffolding members, it being arranged that when the two scaffolding members are clamped the ends of the bolts 13 do not meet within the boring of the stems.

Figure 3:
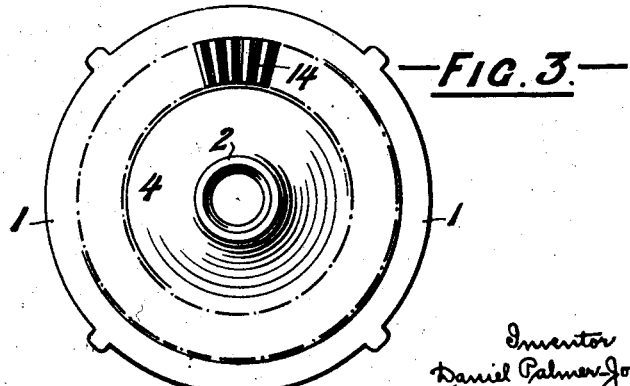
Fig. 3 is an end view of the disc detached, hereafter described.

In the drawing the edge of the extension 12 of each gripping jaw is curved, see Fig. 4, to conform with the curvature of the disc 1, and the faces of the disc are formed with teeth or serrations 14 (Fig. 3) adapted to engage with teeth or serrations formed in the edge of the extension 12.

At Fig. 4 a perspective view of a gripping jaw such as the gripping jaws 7, 8, is illustrated, where the jaw is flanged so as to provide two curved gripping edges 11 which conform with the scaffolding member to be clamped, and this perspective view also illustrates the extension 12.

At Fig. 5 an example is shown of a clamping device according to this invention, similar to Fig. 2 but in which each gripping jaw 15, 16 extends laterally of the stems for a suitable distance to overhang members to be clamped, this construction illustrated being suitable for clamping together two parallel scaffolding members 17, 18, and also for clamping together two parallel scaffolding members 19, 20 with their axes at any angle to the axes of the scaffolding members 17, 18.

A gripping jaw, such as 15 or 16, is shown by the perspective view Fig. 6, from which and from Fig. 5 it will be observed that the jaw, such as 15 Fig. 6, is formed with a hole 21 indicated by dotted lines, through which the bolt 13 passes, or which is passed over the stem of such a construction as at Fig. 1; this jaw 15 overhangs the members to be clamped and the jaw being flanged, the overhanging flanges are formed with curved faces 22 to suit the curvature of the scaffolding members to be clamped.

Such a device can, as illustrated, be employed to clamp only two scaffolding members at any angle relative to each other, by utilizing two of the clamping jaws such as is illustrated at Fig. 4, or as shown at Fig. 5, two pairs of scaffolding members can be clamped parallel to each other and with one pair at any angle to the other pair in parallel planes, by utilizing two jaws such as is illustrated at Fig. 6.

Alternatively two parallel members, such as 17, 18 Fig. 5, can be clamped together upon one face of the disc 1 and a single scaffolding member can be clamped upon the opposite face by utilizing a jaw such as is described at Fig. 4.

What I claim as my invention and desire to secure by Letters Patent is:—

1. A device for clamping together tubular and other members of scaffolding or framework structures; comprising a disc having two coaxial stems one proceeding from each face thereof, the base of each stem conjoining the face of the disc in curved formation with a radius corresponding to the cross section of the scaffolding members which are to be clamped, gripping jaws one to be applied to each stem, said jaws extending laterally of said stems to overhang the scaffolding members contacting with the curved bases of said stems and located between said griping jaws and said disc, said jaws being formed at their ends to partly embrace said scaffolding members to be clamped, and means coacting between said stems and said jaws to force said jaws to grip said scaffolding members between said jaws and said central disc.

2. A device for clamping together tubular and other members of scaffolding or framework structures; comprising a disc having two coaxial stems one proceeding from each face thereof, the base of each stem conjoining said disc in curved formation with a radius corresponding to the cross section of the scaffolding members which are to be clamped, said stems having a through axial boring screwthreaded internally, two gripping jaws to be applied to said stems each of said jaws having a hole for the free passage of a clamping bolt, said jaws extending laterally of said stems to overhang the scaffolding members located between said jaws and said disc and contacting with the curved bases of said stems, said jaws being of curved formation at their outer ends to conform to and partly embrace the external contour of the scaffolding members located between said jaws and said disc, and two clamping bolts one to be passed freely through said hole of one griping jaw and to be screwed into the boring of said stem on one side of said disc and the second bolt to be passed freely through said hole in the second gripping jaw and to be screwed into said stem on the opposite side of said disc to force said gripping jaws into pressure contact with said scaffolding members.

3. A device for clamping together tubular and other members of scaffolding or framework structures; comprising a disc having two coaxial stems one proceeding from each face thereof, the base of each stem conjoining the face of the disc in curved formation with a radius corresponding to the cross section of the scaffolding members which are to be clamped, gripping jaws one to be applied to each stem, each gripping jaw to secure a single scaffolding member, each of said jaws extending laterally of said stems in one direction and having a curved formation at its inner face to overhang and partly embrace said scaffolding member to be clamped and extending beyond said stem at its opposite end and having an extension at such end directed towards and contacting with the face of said disc, and means coacting between said stems and said jaws to force said jaws to grip said scaffolding members between said jaws and said central disc.

4. A device for clamping together tubular and other members of scaffolding or framework structures; comprising a disc having two coaxial stems one proceeding from each face thereof, the base of each stem conjoining the face of the disc in curved formation with a radius corresponding to the cross section of the scaffolding members which are to be clamped, gripping jaws one to be applied to each stem, said jaws extending laterally of said stems to overhang the scaffolding members contacting with the curved bases of said stems and located between said gripping jaws and said disc, said jaws having extending flanges on their inner gripping faces, said flanges having curved faces to conform and contact with the scaffolding members to be clamped to provide for each jaw two curved gripping edges to partly embrace said scaffolding members to be clamped, and means coacting between said stems and said jaws to force said jaws to grip said scaffolding members between said jaws and said central disc.

5. A device for clamping together tubular and other members of scaffolding or framework structures; comprising a disc having two coaxial stems one proceeding from each face thereof, the base of each stem conjoining the face of the disc in curved formation with a radius corresponding to the cross section of the scaffolding members which are to be clamped, gripping jaws one to be applied to each stem, each gripping jaw to secure a single scaffolding member, each of said jaws extending laterally of each of said stems in one direction to overhang the scaffolding member and having a curved formation at its inner face to partly embrace said scaffolding member to be clamped and extending beyond said stem at its opposite end, an extension at the latter end of each jaw to contact with the face of said disc, a series of teeth on the edge of said extension and an annular series of teeth on the face of said disc with which said teeth on said extension engage, and means coacting between said stems and said jaws to force said jaws to grip said scaffolding members between said jaws and said central disc.

In witness whereof I have hereunto set my hand.

DANIEL PALMER-JONES.